United States Patent
Markowz et al.

(10) Patent No.: US 9,748,775 B2
(45) Date of Patent: Aug. 29, 2017

(54) METHOD FOR PROVIDING CONTROL POWER USING AN ENERGY STORE HAVING VARIABLE DEADBAND WIDTH WHEN PROVIDING THE CONTROL POWER

(71) Applicants: Georg Markowz, Alzenau (DE); Wolfgang Schweissthal, Mandelbachtal (DE); Carsten Kolligs, Bottrop (DE); Holger Brezski, Fernwald (DE); Anna Flemming, Frankfurt (DE); Dennis Gamrad, Voerde (DE); Sebastien Cochet, Oberhausen (DE)

(72) Inventors: Georg Markowz, Alzenau (DE); Wolfgang Schweissthal, Mandelbachtal (DE); Carsten Kolligs, Bottrop (DE); Holger Brezski, Fernwald (DE); Anna Flemming, Frankfurt (DE); Dennis Gamrad, Voerde (DE); Sebastien Cochet, Oberhausen (DE)

(73) Assignees: Evonik Degussa GmbH, Essen (DE); STEAG Power Saar GmbH, Saarbruecken (DE)

( * ) Notice: Subject to any disclaimer, the term of this patent is extended or adjusted under 35 U.S.C. 154(b) by 475 days.

(21) Appl. No.: 14/357,401

(22) PCT Filed: Oct. 29, 2012

(86) PCT No.: PCT/EP2012/071374
§ 371 (c)(1),
(2) Date: May 9, 2014

(87) PCT Pub. No.: WO2013/068264
PCT Pub. Date: May 16, 2013

(65) Prior Publication Data
US 2014/0292080 A1  Oct. 2, 2014

(30) Foreign Application Priority Data

Nov. 10, 2011 (DE) .................. 10 2011 055 232

(51) Int. Cl.
*H02J 7/00* (2006.01)
*H02J 3/32* (2006.01)
*H02J 3/24* (2006.01)

(52) U.S. Cl.
CPC  *H02J 7/00* (2013.01); *H02J 3/24* (2013.01); *H02J 3/32* (2013.01); *Y10T 307/305* (2015.04)

(58) Field of Classification Search
None
See application file for complete search history.

(56) References Cited

U.S. PATENT DOCUMENTS 8,378,206 B2   2/2013   Schuette et al.
8,779,720 B2   7/2014   Gaul et al.
(Continued)

FOREIGN PATENT DOCUMENTS

DE  10 2008 024 222 A1   2/2009
DE  10 2009 050 042 A1   2/2011
(Continued)

OTHER PUBLICATIONS

U.S. Appl. No. 14/648,036, filed May 28, 2015, Markowz, et al.
(Continued)

*Primary Examiner* — Jared Fureman
*Assistant Examiner* — Aqeel Bukhari
(74) *Attorney, Agent, or Firm* — Oblon, McClelland, Maier & Neustadt, L.L.P.

(57) ABSTRACT

A method providing control power for an electricity network in which at least one energy store supplies energy to the electricity network and/or takes up energy from the electricity network dependent on a frequency deviation from a (Continued)

desired frequency of the electricity network, a deadband being prescribed around the desired frequency. The frequency deviation from the network frequency is measured with greater accuracy than a width of the deadband and a bandwidth within the deadband is chosen dependent on a charging state of the energy store, with control power being provided outside the bandwidth. A device carrying out the method includes at least one energy store and a control system controlling control power of the energy store in an open-loop or closed-loop manner, the energy store being connected to an electricity network such that energy can be fed into the electricity network and can be removed from the electricity network.

28 Claims, 3 Drawing Sheets

(56) References Cited

U.S. PATENT DOCUMENTS

| | | | |
|---|---|---|---|
| 9,051,526 B2 | 6/2015 | Markowz et al. | |
| 2010/0090532 A1* | 4/2010 | Shelton | H02J 3/32 307/46 |
| 2010/0156348 A1 | 6/2010 | Kirchner | |
| 2011/0245987 A1* | 10/2011 | Pratt | H01M 10/44 700/295 |
| 2012/0200160 A1 | 8/2012 | Pratt et al. | |
| 2013/0071602 A1 | 3/2013 | Eilbracht et al. | |
| 2015/0218475 A1 | 8/2015 | Strese et al. | |
| 2015/0236511 A1 | 8/2015 | Strese et al. | |

FOREIGN PATENT DOCUMENTS

| | | |
|---|---|---|
| EP | 2 139 090 A1 | 12/2009 |
| EP | 2 200 149 A2 | 6/2010 |
| WO | WO 2007/104167 A1 | 9/2007 |
| WO | WO 2010/042190 A2 | 4/2010 |

OTHER PUBLICATIONS

U.S. Appl. No. 14/647,970, filed May 28, 2015, Markowz, et al.
U.S. Appl. No. 14/654,367, filed Jun. 19, 2015, Markowz, et al.
International Search Report issued Apr. 4, 2013 in PCT/EP2012/071374 with English Translation of Category of Cited Documents.
Written Opinion of the International Searching Authority issued Apr. 4, 2013 in PCT/EP2012/071374 (English Translation only).
Alexandre Oudalov et al., "Optimizing a Battery Energy Storage System for Primary Frequency Control", IEEE Transaction on Power Systems, vol. 22, No. 3, Aug. 2007, pp. 1259-1266.
U.S. Appl. No. 14/3547,322, filed May 9, 2014, Markowz, et al.

* cited by examiner

METHOD FOR PROVIDING CONTROL POWER USING AN ENERGY STORE HAVING VARIABLE DEADBAND WIDTH WHEN PROVIDING THE CONTROL POWER

The invention relates to a method for providing control power for an electricity network in which at least one energy store connected to the electricity network supplies energy to the electricity network and/or takes up energy from the electricity network in dependence on a frequency deviation from a desired frequency of the electricity network; and to a device for carrying out such a method.

Electricity networks are used to distribute electricity from usually a number of energy generators in large areas to many users and to supply households and industry with energy. Energy generators, usually in the form of power plants, provide the energy required for this. Electricity generation is generally planned and provided to meet the forecast consumption.

Both when generating and when consuming energy, it is possible however for unplanned fluctuations to occur. These may arise on the energy generator side for example as a result of a power plant or part of the electricity network failing or, for example in the case of renewable energy sources such as wind, the energy generation being greater than forecast. It is also possible with respect to the consuming entities for unexpectedly high or low levels of consumption to occur. The failure of part of the electricity network, for example cutting off some consuming entities from the energy supply, may lead to a sudden reduction in the electricity consumption.

This generally leads to fluctuations in the network frequency in electricity networks due to unplanned and/or short-term deviations of the power generation and/or consumption. In Europe, for example, the desired AC frequency is 50 000 Hz. Such wanted AC frequencies are also referred to as desired frequencies. A reduction in consumption from the planned level leads to an increase in the network frequency of power generated as planned by the energy generators; the same applies to an increase in the electricity production as compared with the planned level when consumption is as planned. On the other hand a reduction in the power produced by the energy generators leads to a reduction in the network frequency when consumption is as planned; the same applies to an increase in consumption as compared with the planned level when generation is as planned.

For reasons of network stability, it is necessary to keep these deviations within defined boundaries. For this purpose, depending on the degree and direction of the deviation, positive control power must be specifically provided by connecting additional generators or disconnecting consuming entities or negative control power must be specifically provided by disconnecting generators or connecting consuming entities. There is a general need for cost-effective and efficient provision of these supplies of control power, it being possible for the requirements for the capacities to be maintained and the dynamics of the control power sources or sinks to vary according to the characteristics of the electricity network.

In Europe, for example, there is a code of practice ("UCT Handbook"), which describes three different categories of control power. In it, the respective requirements for the types of control power are defined. Among the ways in which the types of control power differ are the requirements for the dynamics and the time for which power is to be delivered. They are also used differently with regard to the boundary conditions. Primary control power ('PCP') is to be delivered Europe-wide by all of the sources involved independently of the place of origin of the disturbance, this being substantially in proportion to the frequency deviation at the given time. The absolute maximum power has to be delivered when there are frequency deviations of minus 200 MHz and below (in absolute terms), the absolute minimum power has to be delivered when there are frequency deviations of plus 200 MHz and above. With regard to the dynamics, it is required that, from the non-operative state, the respective maximum power (in terms of the absolute amount) must be provided within 30 seconds. By contrast, secondary control power (SCP) and minutes reserve power (MR) are to be delivered in the balancing periods in which the disturbance has occurred. Their task is to compensate as quickly as possible for the disturbance and ensure that the network frequency is restored as quickly as possible to the desired range, preferably at the latest after 15 minutes. With regard to the dynamics, lower requirements are stipulated for the SCP and MRP (5 minutes and 15 minutes, respectively, before full power is delivered after activation); at the same time, these power outputs must also be provided over longer time periods than primary control power.

In the electricity networks operated until now, a large part of the control power has been provided by conventional power plants, in particular coal-fired and nuclear power plants. This results in two fundamental problems. On the one hand, the conventional power plants providing control power are not operated at full load, and consequently maximum levels of efficiency, but slightly below, in order to be able when required to provide positive control power, possibly over a theoretically unlimited time period. On the other hand, with increasing expansion and increasingly preferred use of renewable energy sources, there are fewer and fewer conventional power plants in operation, which however is often the basic prerequisite for delivering supplies of control power.

For this reason, there are plans under development for increasing use of energy stores to store negative control power and, when required, provide it as positive control power.

The use of hydraulic pumped storage plants for delivering control power is state of the art. In Europe, the various types of control power are delivered by pumped storage plants. However, hydraulic pumped storage plants are also repeatedly cited as currently the most cost-effective technology for storing and retrieving forms of renewable energy, to allow energy supply and demand to be better adapted to one another in terms of time. The potential for the expansion of storage capacities is a controversial subject of discussion—in particular in Norway—since use requires considerable capacities of power lines to be approved and installed. Consequently, use for energy load management is in competition with the provision of control power.

Against this background, in the area of primary control power many plans for also using other energy storage technologies, such as for example flywheel mass and battery stores, for the provision of control power have recently been investigated and described.

US 2006/122738 A1 discloses an energy management system which comprises an energy generator and an energy store, the energy store being able to be charged by the energy generator. This is intended to enable an energy generator that does not ensure uniform energy generation in normal operation, such as for example the increasingly favoured renewable energy sources such as wind-power or photovoltaic power plants, to deliver their energy more uniformly into the electricity network. A disadvantage of this is that, although a single power plant can be stabilized in this way, all other disturbances and fluctuations of the electricity network cannot be counterbalanced, or only to a very limited extent.

It is known from WO 2010 042 190 A2 and JP 2008 178 215 A to use energy stores for providing positive and negative control power. If the network frequency leaves a range around the desired network frequency, either energy is provided from the energy store or energy is taken up in the energy store, in order to control the network frequency. DE 10 2008 046 747 A1 also proposes operating an energy store in an island electricity network in such a way that the energy store is used to compensate for consumption peaks and consumption dips. A disadvantage of this is that the energy stores do not have the necessary capacity to compensate for a lengthy disturbance or a number of successive disturbances in the same direction with regard to the frequency deviation.

In the article "Optimizing a Battery Energy Storage System for Primary Frequency Control" by Oudalov et al., in IEEE Transactions on Power Systems, Vol. 22, No. 3 Aug. 2007, the capacity of a rechargeable battery is determined in dependence on technical and operational boundary conditions, in order that it can provide primary control power in accordance with the European standards ("UCT Handbook"). It has been found that, on account of storage and retrieval losses, in the long term repeated charging of the energy store at relatively great time intervals is unavoidable. Nevertheless, in the short term or temporarily, it may happen that the energy store is overloaded. In the article, a (limited) use of resistors is proposed. However, this leads to energy being destroyed, and generally a depreciation of the energy. In spite of this measure, with a full-load running time of 1.6 hours, the energy store is still of a comparatively large size, at least much larger than to conform to the minimum requirements of the "UCT Handbook". The comparatively high capacities entail corresponding investment costs and often make the use of energy stores uneconomical.

Rechargeable batteries and other energy stores can take up or deliver energy very quickly, as a result of which they are in principle suitable for providing PCP. However, a disadvantage of this is that very large capacities of the rechargeable batteries have to be provided in order to be able to supply the control power even over a lengthy time period or repeatedly. However, rechargeable batteries with a very great capacity are also very expensive.

On account of the losses during storage and retrieval of energy, a draining of the energy store, such as for example a rechargeable battery, takes place sooner or later when there is a statistically symmetric deviation of the network frequencies from the setpoint value through operation. It is therefore necessary to specifically charge the energy store more or less regularly. This charging current must possibly be paid for separately.

U.S. Pat. No. 7,839,027 B2 and WO 2010 042 190 A2 disclose a method of the generic type for providing control power by an energy store. In this method, the energy store is charged or discharged in the times in which no control power is required, that is to say within a deadband around the desired frequency of the network frequency, in order to achieve a desired initial state of charge. A disadvantage of this is that the power must be drawn from the network, that is to say must be paid for. It is also disadvantageous that, if many control cycles follow one another, the energy store is still always strongly charged or discharged. Therefore, a large capacity (energy storage capacity) of the energy store must still always be provided.

Charging within the deadband independently of the frequency value of the network frequency leads to influencing of the frequency network if the energy drawn or delivered is not at the same time produced or taken up elsewhere. Under unfavourable circumstances, this process has the effect that the network frequency moves away from the (ideal) setpoint value (of the desired frequency), and is consequently brought closer to the limit of the deadband from which control energy again generally has to be provided for reasons of system stability. If the drawing of energy or the delivery of energy takes place in the form of a corresponding trade such that the energy to be delivered from the energy store is always at the same time taken up elsewhere or the energy to be taken up by the energy store is always produced elsewhere, although there is no disturbance there is also no reason only to do this in the deadband. On the contrary, confining this to the deadband restricts the possibilities of adapting the charging state to the times in which the network frequency is in this deadband. This has the tendency to lead to higher energy storage capacities than if adaptation of the charging state can take place at any time desired. It is also a disadvantage of this procedure that these trading processes have to be organised and implemented, which leads to additional costs and restrictions (for example in the search for trading partners).

It can be seen as a further disadvantage of the prior art that, at least for a time, no control power is delivered in the deadband, or the electricity network is even loaded with counterproductive power for the adaptation of the charging state of the energy store.

Consistent adherence to the guidelines for the prequalification of primary control technologies requires the provision of corresponding power reserves at every desired operating time, and consequently every desired state of charge of the energy store. This requirement (in Germany at present: the marketed primary control power over a period of 15 minutes) has the effect that a corresponding capacity has to be provided, resulting in increased investment costs. In fact, such a reserve would (on a statistical basis) only be used very rarely.

It has been found in the course of developing the invention that sometimes considerable amounts of energy are fed in or out monotonously, as shown by an analysis of actual variations in frequency conducted by the inventors. With a given storage capacity, this leads to a correspondingly great change in the charging state. Great changes in charging state in turn tend to lead to faster ageing than small changes in charging state. Consequently, either the energy store reaches the end of its lifetime and must be exchanged earlier, or the capacity has to be increased a priori in order to reduce the relative change in charging state. Both lead to an increase in investment costs.

The object of the invention is therefore to overcome the disadvantages of the prior art. In light of the prior art, it is thus particularly the object of the present invention to provide a technically improved method for providing control power for an electricity network in which at least one energy store connected to the electricity network supplies energy to the electricity network and/or draws energy from the electricity network as required that is not affected by the disadvantages of conventional methods. It is also intended to find a possible way of improving the cost-effectiveness of the operation of energy stores, such as rechargeable batteries, for the provision of primary control power by avoiding inefficient charging states. It is intended at the same time as far as possible to make the provision of primary control power possible with lower energy storage capacity. Moreover, it would also be advantageous if less loading with an ageing effect could be achieved. Furthermore, the provision of primary control power while avoiding intermediate charging would also be desirable. It is also intended for control power to be provided with an efficient energy yield of the control power supplier.

It can be seen as a further object of the invention that, in particular when using galvanic elements, such as rechargeable batteries, the capacity of the energy store for providing the required control power is intended to be as small as possible.

Furthermore, an object of the present invention is to find a method in which the described disturbances of the electricity network and at the same time trading processes are avoided or reduced. Furthermore, it should be possible for the method to be carried out as easily and inexpensively as possible.

It would also be desirable if constructive control power were also provided in the deadband, that is to say controlling to the desired frequency were also to take place at least for a certain time in the deadband.

In addition, it should be possible for the method to be carried out with fewest possible method steps, while these steps should be simple and reproducible.

Further, not explicitly mentioned objects emerge from the overall context of the following description, examples and claims.

These objects and further objects, which are not explicitly mentioned but readily emerge or are readily foreseeable from the contexts discussed in the introduction hereof, are achieved by a method having all the features of Patent Claim 1. Expedient modifications of the method according to the invention for providing control power for an electricity network in which at least one energy store connected to the electricity network supplies energy to the electricity network and/or draws energy from the electricity network as required are afforded protection in dependent Claims 2 to 22. Furthermore, the subject matter of Patent Claim 23 is a device for carrying out such a method, while expedient modifications of this device are afforded protection in dependent Claims 24 to 26.

The present invention is accordingly realized by a method for providing control power for an electricity network in which at least one energy store connected to the electricity network supplies energy to the electricity network and/or draws energy from the electricity network in dependence on a frequency deviation from a desired frequency of the electricity network, a deadband in which the frequency deviation from the network frequency is measured with a greater accuracy than the width of the deadband being prescribed around the desired frequency and a bandwidth within the deadband being chosen in dependence on a charging state of the energy store, with control power being provided outside the bandwidth.

The deadband around the desired frequency of the network frequency is defined by limits of the frequency deviation from the desired frequency. Within the deadband, or within the limits, no control power has to be delivered. The limits of the deadband are prescribed by the operator of the electricity network and/or authorities.

Apart from the frequency deviation from the desired frequency of the network frequency, other signals could also be used by the network operator as the setpoint value for the delivery of control power (alternatively also for the delivery of Regulation power, Operating Reserve power, etc.). The methods described here, which use the tolerances allowed by the network operator relating to the frequency deviation as a setpoint value for controlling the charging state of an energy store, may also be used in systems in which the setpoint value for the delivery of control power (e.g. Area Control Error, ACE) is sent by the network operator directly to the party delivering control power. Here, too, the parties delivering control power may be allowed a deadband that could possibly be used as a tolerance for controlling the charging state (in the case of energy stores).

The bandwidth defines a variable deadband, the width of which depends on the charging state of the energy store. The widths of the bandwidth and of the deadband are scaled to the frequency deviation, that is to say relate to a frequency, or indeed the frequency deviation. The variable deadband should not be confused with the deadband prescribed by the network operator.

In particular, the method may be a method for providing primary control energy.

This successfully realizes in an unforeseeable way a method for providing control power for an electricity network in which at least one energy store connected to the electricity network supplies energy to the electricity network and/or draws energy from the electricity network as required that is not affected by the disadvantages of conventional methods.

It is also ensured in this way that there are no processes balancing out the charging state of the energy store that direct the electricity network or the network frequency in an undesired direction (away from the desired frequency), and at the same time the number of agreement processes required through the energy trade is reduced.

Furthermore, the cost-effectiveness of the operation of energy stores, such as rechargeable batteries, for the provision of primary control power is improved by the method according to the invention by avoiding inefficient charging states, provision of primary control energy with a lower energy storage capacity being made possible in particular.

What is more less loading with an ageing effect is achieved by the method according to the invention, while also avoiding intermediate charging for the provision of primary control power.

Furthermore, the required control power is provided with an efficient energy yield of the control power supplier.

Systems with a greatly limited storage size come into consideration in particular as energy stores. In English-speaking countries, these are sometimes referred to as Limited Energy Storage Resources (LESRs).

In particular when using galvanic elements, such as rechargeable batteries, the capacity of the energy store for providing the required control power can be kept low on account of the possibility of quickly changing the control power of the energy store.

In addition, the method according to the invention can be carried out very easily and inexpensively.

Furthermore, the method can be carried out with relatively few method steps, while these steps are simple and reproducible.

In the case of the method according to the invention, it may preferably be provided that, in dependence on the charging state, in particular the charging state at the given time, of the energy store, the bandwidth is chosen to be less than the width of the deadband if the charging state deviates from a medium charging state, the semi-charged charging state at which the energy store contains approximately half of the maximum possible energy content, in particular between 40% and 60% of the maximum possible energy content, preferably being defined as the medium charging state, or a charging state range in the region of the semi-charged charging state, particularly preferably comprising the semi-charged charging state, in particular between 20% and 80% of the maximum possible energy content, most particularly preferably between 30% and 70% of the maximum possible energy content, being defined as the medium charging state.

It may in this case be provided that one of the limits of the bandwidth is defined as that frequency deviation from the desired frequency that is established by the accuracy of the measurement, or one of the limits of the bandwidth is defined by the desired frequency or by a frequency deviation between these values, the lower limit of the bandwidth being defined in this way if the charging state of the energy store is to be reduced, in particular the charging state lies above the medium charging state, and/or the upper limit of the bandwidth being defined in this way if the charging state of the energy store is to be increased, in particular the charging state lies below the medium charging state.

Such configurations of the invention have the effect that the energy store can be formed with a particularly small energy storage capacity.

In order to make it possible to provide control power particularly efficiently and advantageously for the network operator, it may be provided that, for at least one charging state of the energy store, the bandwidth is reduced to the accuracy of the measurement of the frequency deviation.

It may also be provided that the charging state of the energy store is adapted, preferably a medium charging state is aimed for, by the choice of the bandwidth and the provision of control power in the deadband.

According to a further embodiment of the invention, it may also be provided that the bandwidth is selected from two or more predetermined bandwidths, various states of charge, preferably every charging state of the energy store or various ranges of the charging state, preferably every range of the charging state, being assigned predetermined bandwidths.

The predetermined bandwidths may be fixed in advance or else be functions of other parameters, such as for example the time of day, the time of year, the day of the week, the time, the state of the energy store (for example due to ageing), the pooling with other energy stores or with energy generators or energy consuming entities and/or other variables influencing the control power to be expected. Preselected bandwidths make it easier for the method to be carried out, since complicated calculations then no longer have to be carried out.

According to a further advantageous embodiment of the method according to the invention, it may be provided that the bandwidth is chosen in proportion to a difference in charging state of the charging state at the given time of the energy store from the medium charging state, in particular the bandwidth depends linearly on the difference in the charging state of the charging state at the given time from the medium charging state.

This involves carrying out calculations which, though they complicate the method, also have the effect that the charging state of the energy store only changes to a great extent when there are great deviations, and consequently brings about an expedient return of the charging state to the medium charging state.

It may also be provided that the charging state of the energy store is measured, in particular measured continuously, the control power delivered by the energy store to the electricity network being controlled in dependence on the charging state.

A further embodiment of the method according to the invention may provide that, outside the bandwidth, control power is provided as desired by the network operator and/or the amount of the control power is delivered with respect to the frequency deviation in certain regions in inverse proportion to the frequency deviation of the network frequency, preferably linearly to the frequency deviation.

This embodiment is particularly advantageous for the network operator and the network frequency, since the energy store does not operate counterproductively, but is even productive in the deadband, that is to say regulating the network frequency.

The same advantage is offered by a method according to the invention in which it is provided that, within the bandwidth, no power is delivered from the energy store into the electricity network and no power is taken up from the electricity network into the energy store.

A particularly preferred embodiment of the invention may provide that the frequency deviation is measured with an accuracy of at least ±8 MHz, particularly preferably of at least ±4 MHz, most particularly preferably of at least ±2 MHz, especially preferably of at least ±1 MHz.

With these accuracies, particularly efficient control of the state of charge of the energy store can take place. The greater the accuracy can be carried out when determining the frequency deviation of the network frequency from the setpoint value, the greater the latitude that can be used to adapt the charging state of the energy store. It therefore applies in principle that a greater accuracy has the effect that the bandwidth can be chosen to be narrower, and thus a more efficient setting of the charging state is possible. As from an accuracy of ±1 MHz, and consequently a bandwidth of at least 2 MHz, however, this no longer leads to any clear improvement.

A further embodiment of the invention may provide that, when there is a change of the required control power, the time after the change from which control energy is provided by the energy store is chosen in dependence on the charging state at the given time of the energy store.

It may be provided in this case that the time lies in a time interval between the change of the required control power and a maximum time after the change, the time interval particularly being 30 seconds in the case of provision of primary control power.

It may also be provided that the charging state of the energy store is adapted by choosing the time, in particular a desired medium energy content in the energy store is aimed for, the desired medium energy content lying in the range between 20% and 80% of the maximum energy content in the energy store, preferably lying between 40% and 60%, particular preferably at 50% of the maximum energy content in the energy store.

By aiming in this way for a medium desired charging state or the medium desired energy content of the energy store, the use of such an energy store can be used in a surprisingly advantageous way for the provision of control power for an electricity network, without for example energy stores with greater capacities becoming necessary. In this way, the disadvantages of classical energy generators and energy consuming entities, which have to be operated at least in part load for the provision of control power, can be avoided. The great moment of inertia of such power plants with respect to the running up and running down of the operational power generates enormous additional costs, and is to this extent disadvantageous. In the case of rechargeable batteries as the energy store, the charging state corresponds to the state of charge (SOC) or the energy content (state of energy, SoE).

It may also be provided that a control power gradient is chosen in dependence on the charging state of the energy store, the variation over time of the amount of the control power being particularly set and the tolerance of the amount of the control power to be provided over time being used.

It may be provided in this case that, when there is a change of the request for control power, in particular when there is a measured change of the frequency deviation, the dynamic behaviour with which the energy store reacts to the change of the setpoint value is chosen in dependence on the charging state at the given time of the energy store, the chosen dynamic behaviour preferably depending on the type of control power requested, in particular the time in which the full control power has to be delivered being 30 seconds in the case of provision of primary control power, 5 minutes in the case of provision of secondary control power and 15 minutes in the case of provision of minutes reserve power.

A further embodiment of the invention using the dynamic tolerance may provide that the suitable choice of the dynamic behaviour of the energy store is a response to the change of a request for control power and the charging state of a energy store is adapted as a result.

In a preferred embodiment of the method according to the invention it may be provided that, when there is a change of the required control power, positive control power is fed into the electricity network at an early time, preferably immediately, and/or negative control power is removed from the electricity network at a late time, preferably at the latest possible time, if the charging state of the energy store lies above a first limit value and/or, when there is a change of the required control power, negative control power is removed from the electricity network at an early time, preferably immediately, and/or positive control power is fed into the electricity network at a late time, preferably at the latest possible time, if the charging state of the energy store lies below a second limit value, the two limit values particularly preferably defining a desired medium charging state.

The coupling of the dynamic provision of control power by the energy store in dependence on its charging state makes it possible in an advantageous way to react to control power requests, it being intended to use the capacity of the energy store in such a way that it is as far as possible in the medium charging state, in order in this way to ensure the most efficient and cost-conscious handling.

In a further embodiment of the method according to the invention, the energy store is operated jointly with at least one energy generator and/or at least one energy consuming entity for the provision of control power for the electricity network.

It may be provided in particular here that the energy store is operated in its closed-loop control and/or open-loop control in dependence on and in operative connection with the at least one energy generator and/or with the at least one energy consuming entity in the provision of control power for an electricity network.

A power plant, preferably a coal-fired power plant, a gas-fired power plant or a hydroelectric power plant, may be used as the energy generator, while a works for producing a substance, in particular an electrolysis works, or a metal works, preferably an aluminium works or steelworks, may be used as the energy consuming entity.

Such energy generators and energy consuming entities are well suited for the provision of supplies of control power in the relatively long term. According to the invention, their inertia can be balanced out well by energy stores.

A further preferred embodiment of the invention may provide that in the deadband no negative control power is taken up by the electricity network if the charging state of the energy store lies above a first limit value and/or in the deadband no positive control energy is fed into the electricity network if the charging state of the energy store lies below a second limit value, the two limit values preferably defining the medium charging state range.

It may also be provided that a flywheel, a heat store, a hydrogen generator and store with a fuel cell, a natural gas generator with a gas-fired power plant, a pumped storage power plant, a compressed-air storage power plant, a superconducting magnetic energy store, a redox-flow element and/or a galvanic element, preferably a rechargeable battery and/or a battery storage power plant, is used as the energy store. The heat store must be operated together with a device for producing electricity from the stored thermal energy.

In particular, a lithium-ion battery, a lead-sulphuric acid battery, a nickel-cadmium battery, a sodium-sulphide battery and/or a Li-ion battery and/or a composite of at least two of these rechargeable batteries may be used as the energy store.

Rechargeable batteries in particular are particularly suitable for methods according to the invention, on account of their rapid reaction time, that is to say the rate at which the power can be increased or reduced. Moreover, the efficiency, in particular in the case of Li-ion batteries, is good in comparison with many other energy stores.

The rechargeable batteries include, in particular, lead batteries, sodium-nickel chloride batteries, sodium-sulphur batteries, nickel-iron batteries, nickel-cadmium batteries, nickel-metal hydride batteries, nickel-hydrogen batteries, nickel-zinc batteries, tin-sulphur-lithium-ion batteries, sodium-ion batteries and potassium-ion batteries.

Of these, rechargeable batteries that have a high efficiency and a high operational and calendar lifetime are preferred. As a particularly preferred embodiment of the invention, lithium-polymer batteries, lithium-titanate batteries, lithium-manganese batteries, lithium-iron-phosphate batteries, lithium-iron-manganese-phosphate batteries, lithium-iron-yttrium-phosphate batteries, lithium-air-batteries, lithium-sulphur batteries and/or tin-sulphur-lithium-ion batteries are used as lithium-ion batteries.

It may also be provided that the energy store has a capacity of at least 1 kWh, preferably at least 10 kWh, particularly preferably at least 50 kWh, most particularly preferably at least 250 kWh.

The capacity of electronic energy stores may in this case be at least 40 Ah, preferably approximately 100 Ah. The individual cells of electronic energy stores may operate at at least 1 V, preferably at least 10 V, particularly preferably at at least 100V.

These capacities are still relatively low for the operation of a control power power plant or a control power consuming entity. The great capacity in comparison with commercially available small energy stores, such as for example rechargeable batteries of a mobile phone, and the great energy storing ability are suitable for allowing the considerable amounts of energy for the methods according to the invention to be provided, even in the case of large electricity networks.

It may also be provided that the energy store is operated jointly with at least one energy generator and/or at least one energy consuming entity for the provision of control power for the electricity network.

It may be provided in this case that a closed-loop control and/or open-loop control of the energy store is operated in dependence on and in operative connection with the at least one energy generator and/or with the at least one energy consuming entity in the provision of control power for an electricity network.

The combination of the energy store with an energy generator and/or energy consuming entity also makes it possible for unilateral supplies of control power to be provided even in the long term.

A further embodiment of the invention may provide that a tolerance with respect to the frequency deviation from the desired frequency of the electricity network is used in order to set the charging state of the energy store at the same time as providing the control power by the energy store.

If other tolerances are additionally used to adapt the charging state of the energy store, the capacity of the energy store can be chosen to be smaller, and thus resources and costs can be saved.

Accordingly, it may also be provided that the tolerance with respect to the amount of the control power provided is used in order to set the charging state of the energy store at the same time as providing the control power by the energy store, preferably the amount of the requested control power being exceeded, in particular by a maximum of 30% and/or by 10 MW, particularly preferably by a maximum of 20% and/or by 10 MW, to make use of the tolerance with respect to the amount of the control power provided, the percentage by which the amount of the requested control power is exceeded being chosen particularly preferably in proportion to the deviation of the charging state of the energy store from the medium charging state.

In the case of both of these embodiments of the method according to the invention, it may be provided that the charging state of the energy store is set by the energy store feeding into the electricity network a greater control power, lying within the tolerance or the tolerances, or taking up from the electricity network a smaller control power, lying within the tolerance or the tolerances, in the case where the charging state of the energy store lies above a first limit value, and/or the energy store feeding into the electricity network a smaller control power, lying within the tolerance or the tolerances, or taking up from the electricity network a greater control power, lying within the tolerance or the tolerances, in the case where the charging state of the energy store lies below a second limit value.

This provides details of how control of the charging state according to the invention can be achieved. These principles reflect generally applicable reference points of a method according to the invention that achieves the objects on which the invention is based.

The tolerance with respect to the amount of the control power provided and the tolerance in the determination of the frequency deviation should be understood according to the invention as meaning that, on account of technical boundary conditions, such as the measuring accuracy when determining the control power delivered or the network frequency, certain deviations between an ideal desired power and the control power actually delivered are accepted by the network operator. The tolerance may be granted by the network operator, but could also correspond to a legal provision.

The advantage of this procedure can be seen as being that it succeeds in controlling the charging state (state of charge) of the energy store or the amount of energy contained in the energy store also during the delivery of the control power, and consequently also continuously. The terms state of charge and charging state are to be regarded according to the invention as equivalent.

When using limit values of the bandwidth, it may be provided that the first limit value of the charging state lies between 40% and 80% of the maximum charge of the energy store, preferably between 45% and 70%, particularly preferably between 50% and 60%, and/or the second limit value of the charging state lies between 20% and 60% of the maximum charge, preferably between 30% and 55%, particularly preferably between 40% and 50%, or the first and second limit values of the charging state lie at 50% of the maximum charge of the energy store.

The stated ranges for the limit values of the charging state of the energy store are particularly suitable according to the invention for realizing methods according to the invention. In particular in the case of a great capacity of the energy store, the limit values may also lie at 80% and 20%, respectively, of the maximum charge of the energy store.

A particularly preferred embodiment of a method according to the invention is obtained if it is provided that a control power gradient is chosen in dependence on the charging state of the energy store, the variation over time of the amount of the control power being particularly set and the tolerance of the amount of the control power to be provided over time being used.

This makes use of the fact that there are tolerances with respect to the rise or fall of the control power to be provided, given for example by the network operator or by legal provisions. These tolerances may be used according to the invention to adapt the charging state of the energy store. This provides a further improvement in the optimization of the charging state, or this embodiment represents a particularly preferred realization of the method according to the invention. As a result, the size, or the capacity, of the energy store can be reduced further.

It may also be provided particularly preferably that, when there is a change of the frequency deviation by less than a range of insensitivity, in particular by less than 10 MHz, a changed control power can only be delivered to set the charging state of the energy store, in particular the changed control power can only be delivered if the charging state of the energy store is thereby charged or discharged as strongly as possible towards the medium charging state or as little as possible away from the medium charging state.

The change of the frequency deviation relates here to that frequency deviation at which the last control power adaptation took place. This makes use of a further tolerance. This tolerance may be given by the network operator or the legislature or be inherent within the system. The tolerance allows that no adaptation of the control power has to take place when only small changes of the frequency deviation of the network frequency from the desired frequency occur. In order to develop the charging state of the energy store in the desired direction, control power may nevertheless be delivered. This delivery of control power possibly takes place in the way desired, that is to say for example directly in inverse proportion to the frequency deviation. If therefore control power is delivered to adapt the charging state, this would contribute to controlling the network frequency. The adaptation of the charging state therefore always takes place constructively in the sense of controlling the network frequency. A precondition for this is that the frequency deviation can be measured with greater accuracy than the range of insensitivity. The range of insensitivity is a measure of the tolerance of the change of the frequency deviation from which a change of the control power is required or necessary.

The object of the invention is also achieved by a device for carrying out such a method, the device comprising at least one energy store and a control system for controlling the control power of the energy store in an open-loop or closed-loop manner, the energy store being connected to an electricity network in such a way that energy can be fed into the electricity network and can be removed from the electricity network by the device.

In the present case, a control system is understood according to the invention as meaning a simple control system. It should be noted here that any closed-loop control comprises an open-loop control, since in closed-loop control an open-loop control takes place in dependence on a difference between an actual value and a setpoint value. The control system is therefore preferably formed as a closed-loop control system, in particular with respect to the charging state. Particularly preferably, the control system is a master control system.

It may in this case be provided that the device comprises at least one energy generator and/or at least one energy consuming entity that is/are connected to the electricity network in such a way that control power can be fed into the electricity network by the energy generator and/or can be removed from the electricity network by the energy consuming entity and the energy store can preferably be charged by the energy generator and/or discharged by the energy consuming entity.

It may also be provided that the device comprises a device for measuring the charging state of the at least one energy store and/or a device for measuring the frequency deviation of the network frequency from the desired frequency and a data memory, at least a bandwidth and/or the medium charging state of the energy store being stored in the data memory, the control system having access to the data memory and being designed for controlling the control power delivered and taken up by the energy store in dependence on the charging state of the energy store and/or on the frequency deviation.

It may also be provided that the energy store is a rechargeable battery, preferably a lithium-ion battery, a lead-sulphuric acid battery, a nickel-cadmium battery, a sodium-sulphide battery and/or a Li-ion battery and/or a composite of at least two of these rechargeable batteries.

The invention is based on the surprising finding that it is sufficient for adapting the charging state of an energy store to the delivery of control power only not to deliver any control power in part of the deadband, in order to develop the charging state in the direction of a desired medium charging state. In fact, in the case of operation according to the invention by a method according to the invention, the energy store also delivers control power when there is a frequency deviation, and therefore at times at which it does not have to. To this extent, an additional stabilization of the network frequency at the desired frequency is achieved by the method according to the invention.

At the same time, energy stores according to the invention may be operated in such a way that the tolerances given by the network operators are used when delivering control power for keeping the charging state of the energy store in a medium range, and thus keeping the capacity of the energy store within low-cost boundaries. This applies in particular to energy stores that can take up and deliver energy quickly, that is to say with high power gradients, such as for example flywheels and, in particular, storage batteries and battery stores. Among the reasons for the tolerances allowed by the network operators, such as the deadband, is therefore that the control power is usually provided at present by relatively large power plants, such as for example coal-fired power plants, and relatively large consuming entities, such as for example electrolysis works. These control power suppliers have a great inertia in taking up and delivering control power, that is to say that their power gradients are small and effects such as overshooting within certain boundaries are unavoidable. Therefore, certain tolerances are allowed. Thus, for example, control power suppliers do not have to supply control power even when there are extremely small deviations of the network frequency from the desired frequency, but instead a tolerance from which control power has to be made available is allowed in the form of a deadband in the frequency deviation of the network frequency. Furthermore, a tolerance is allowed in the measurement of the frequency deviation of the network frequency, so that the control power to be delivered can be chosen freely within certain boundaries (within a tolerance).

Also the time from which control power has to be delivered after a change of the required control power, that is to say a change of the setpoint value of the control power after which the required control power has changed, has a tolerance. This tolerance may also be used according to the invention to adapt the charging state of the energy store in that more or less energy is stored into the energy store or more or less energy is delivered from the energy store to the electricity network. In dependence on the charging state (that is to say as required), a slower-responding control power source is produced by the control system with the energy store, in order to adapt the charging state of the energy store.

A further tolerance is also obtained in the accuracy of what power can be fed into the electricity network or can be taken up from the electricity network. In this respect, it is usually not important to the network operator whether the control power required is delivered or whether it is exceeded by a certain amount.

These tolerances and the tolerance with respect to the deadband can be used to make available more or less control power, and thus charge or discharge the energy store specifically more strongly or less strongly. As a result, the charging state can be specifically influenced. The invention thus succeeds in keeping the charging state of the energy store in a desired range, for example in a medium range, so that the energy store is in a good, or even optimum, initial state for the next or a changed control power request.

The charging state then no longer has to be controlled, or can be controlled with less energy from the electricity network. Moreover, the capacity of the energy store can be chosen to be smaller. Both save costs.

Among the ways in which battery stores (rechargeable batteries) are distinguished in comparison with conventional technologies for providing primary and/or secondary supplies of control energy is that they can change the supplies of power delivered much more quickly. However, in most cases it is disadvantageous with battery stores that they have a comparatively small storage capacity, and therefore can only deliver the required supplies of power over a limited period of time. In a statistical evaluation of the frequency deviations over time, it has surprisingly been found in the course of developing the present invention that, in over 75% of the active time (that is to say power other than zero is delivered), the required supplies of power amount to less than 20% of the maximum power or the marketed power.

It likewise follows from this finding according to the invention that the capacity of the energy store, and consequently the stored amount of control power to be kept available, can be chosen to be smaller, and keeping the capacity of the energy store small can be achieved particularly successfully by a method according to the invention.

The invention makes use of the fact that it is possible with modern measuring devices and measuring methods to determine the frequency deviation of the network frequency more accurately than is required at present for delivering control power. This makes it possible for the control power that is to be delivered to be chosen freely within the prescribed tolerances (that is to say within the prescribed limits) and, as a result, for methods according to the invention to be realized.

Special and particularly preferred embodiments of the ways of achieving the objects are that the energy store is a rechargeable battery or a battery store that is used for delivering primary control power.

In a further special embodiment, the energy taken up into the energy store in the case of negative primary control power is sold on the spot market, in particular when the conditions there are advantageous.

According to a further embodiment, it may be provided within the provisions for delivering control power that in particular more energy is taken up from the network by the energy store than is fed in. This may take place because, according to the regulations including the previously set out procedure, preferably a very large amount of negative control power is provided, whereas, according to the regulations including the previously set out procedure, preferably only the minimum assured amount of positive control power is delivered. Preferably, on average at least 0.1% more energy is taken from the network than is fed in, in particular at least 0.2%, preferably at least 0.5%, particularly preferably at least 1.0%, especially preferably 5%, these values being referred to an average that is measured over a time period of at least 15 minutes, preferably at least 4 hours, particularly preferably at least 24 hours and especially preferably at least 7 days, and relates to the energy fed in.

This may involve using the previously set out delivery of control power in order to take a maximum of energy from the network, the maximum possible negative control power being provided while only a minimum of positive control power is delivered.

In the embodiments of the preferred, and especially maximum, energy take-up, the supplies of energy thereby taken from the network can be sold through the previously described energy trade, this preferably taking place at times at which a price that is as high as possible can be achieved. Forecasts of the price development that are based on historical data may be used for this purpose.

Furthermore, the charging state of the energy store at the time of a planned sale of energy may be preferably at least 70%, particularly preferably at least 80% and particularly preferably at least 90% of the storage capacity, the charging state after the sale preferably being at most 80%, in particular at most 70% and particularly preferably at most 60% of the storage capacity.

In preferred embodiments of the invention, a number of energy stores are pooled and operated by a procedure according to the invention. The size of the energy stores within the pool may vary. In a particularly preferred embodiment, when using tolerances, in particular when choosing the bandwidth in the deadband, for the various energy stores of a pool, the change from one parameter setting to another is not performed synchronously but specifically at different times, in order to keep any disturbances in the network as small as possible or at least to a tolerable level.

In a further preferred embodiment, the tolerances used in the various procedures, in particular the choice of the bandwidth in the deadband, vary according to the time of day, the day of the week or the time of year. For example, in a time period from 5 minutes before to 5 minutes after the change of hour, tolerances are defined more narrowly. The reason for this is that very often rapid frequency changes take place here. It may be in the interests of the transmission network operators that there are smaller tolerances here, and consequently the provision of control energy takes place more dependably, in the sense of more strictly.

The object can be achieved according to the invention by using a frequency measurement with greater accuracy than corresponds to the tolerance of the deadband (for example in the "Grid Code"±10 MHz), and the customary deadband (at present in the "Grid Code"±10 MHz) being reduced in its width to at most the actual frequency measuring accuracy. The reduced deadband is equivalent to the chosen bandwidth. As an exemplary embodiment: if the frequency measuring accuracy is ±2 MHz, the deadband can be reduced to down to ±2 MHz or a bandwidth of up to 4 MHz can be chosen. Operation outside the deadband of variable width, that is to say outside the bandwidth, respectively conforms otherwise to the usual regulations.

In the following text, exemplary embodiments of the invention are explained on the basis of three schematically depicted figures, without however restricting the invention in the process. In detail.

Figure 1:
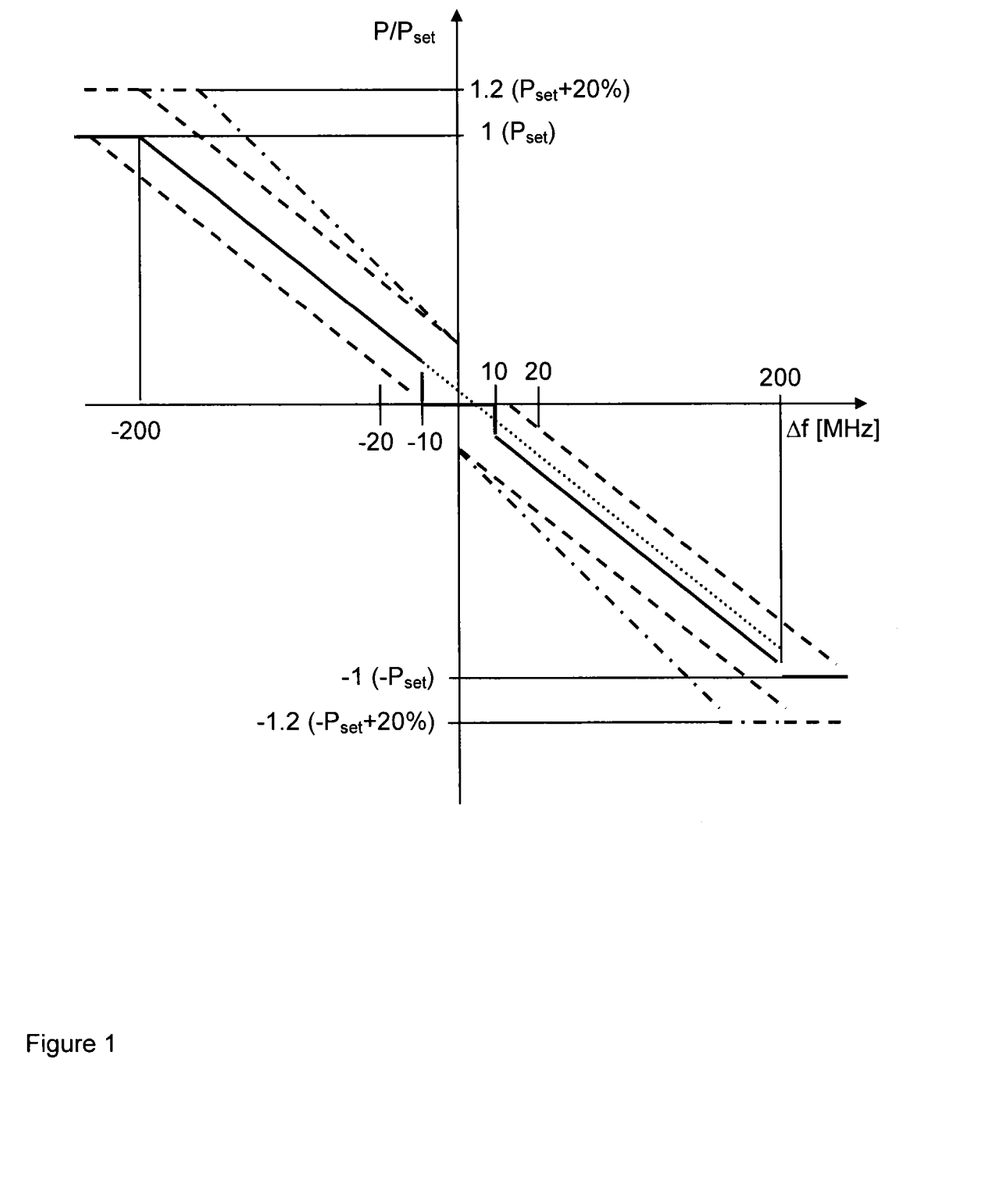
FIG. 1 shows a schematic control power/time diagram for a method according to the invention.

FIG. 1 shows a schematic diagram by way of example of the normalized power $P/P_{set}$ against the frequency deviation $\Delta f = f - f_{set}$ for delivering primary control power, as required by network operators. Here, f is the frequency at a given time of the electricity network and $f_{set}$ is the desired frequency of the electricity network. In the European electricity network, a desired frequency of 50 000 Hz is set; the tolerance in the measurement of the frequency deviation is in this case currently ±10 MHz. The middle, solid curve (made up of lines) shows the control power P required by the network operator as a dimensionless power $P/P_{set}$ normalized to the nominal power $P_{set}$. With a value of 1, the nominal power $P_{set}$ is therefore reached as a positive control power P and, with a value of −1, the nominal power $-P_{set}$ is therefore reached as a negative control power P. In the present case, the nominal power $P_{set}$ is provided from frequency deviations of 200 MHz from the desired network frequency of 50 000 Hz. The dashed lines that enclose the solid line represent the tolerance in the measurement of the frequency deviation (±10 MHz).

To achieve the effect with a given tolerance in the measurement of the frequency deviation (±10 MHz) that the provision of control power serves exclusively for stabilizing the network frequency, and counter-productive operation does not occur, control power must not be delivered in a deadband or a tolerance of ±10 MHz around the desired network frequency of 50 000 Hz. Otherwise, that is to say if the dotted line were followed in the range from −10 MHz to +10 MHz, the tolerance in the measurement of the frequency deviation could cause the situation to occur that, with an actual frequency deviation in the range from 0 MHz to +10 MHz (for example +4 MHz), because of this tolerance a positive control power would be provided even though a negative control power were actually desired, if on account of this tolerance a false frequency deviation in the range from −10 MHz to 0 MHz had been measured on account of an allowed deviation of up to −10 MHz.

The deadband may be understood as a tolerance in the delivery of control power. Since a tolerance of ±10 MHz is allowed in the measurement of the frequency deviation Δf, the deadband must therefore be introduced in order to prevent counter-productive control power. This has the effect that, at −10 MHz and at +10 MHz, the solid line has a step, where the control power is intended to be increased abruptly, and that the dashed lines are interrupted at the axes. Outside the deadband, a control power that is inversely proportional to the frequency deviation Δf is required (the amount of the control power is proportional to the amount of the frequency deviation Δf).

The negative and positive control power delivered, and the control power to be delivered, may also be exceeded by up to 20%, but there must not be any shortfall. This tolerance is represented in the diagram according to FIG. 1 by the lines with dashes and dots. In addition, exceeding by a fixed amount, for example by 5 MW, could also be allowed. This additional tolerance is not taken into consideration and not represented in the present FIG. 1.

Methods according to the invention make use of the fact that, with a more accurate measurement of the frequency deviation than ±10 MHz (for example ±4 MHz) in the deadband of ±10 MHz (horizontal solid line, which between +10 MHz and −10 MHz lies exactly on the axis of the frequency deviation Δf), there can be defined a bandwidth within which no power is delivered, it being possible outside this bandwidth for control power to be delivered normally (in inverse proportion to the frequency deviation) (along the dotted line), without the control power being delivered counterproductively. At the same time, with a suitable choice of the limits of the bandwidth, the charging state of the energy store by which the control power is delivered can be adapted.

For the example of an accuracy of ±4 MHz, therefore a bandwidth of 8 MHz to 20 MHz can be chosen, the limits always having to maintain at least a distance of 4 MHz from the frequency deviation of 0 MHz (perpendicular $P/P_{set}$ axis) if it is intended to ensure that counter-productive control power is not delivered under any circumstances. The bandwidth thereby defines a new deadband. Therefore, because the bandwidth can be chosen, it can according to the invention also be considered and referred to as a variable deadband. Within the bandwidth or the variable deadband, no control power is delivered. Outside the bandwidth, on the other hand, it is possible for control power to be delivered and, as outside the deadband given by the network operator, used to work against the frequency deviation and thus stabilize the network frequency.

However, choosing the limits of the bandwidth or of the variable deadband also allows the charging state of the energy store to be adapted. For the example of an accuracy of the measurement of the frequency deviation of ±4 MHz, this can be realized for example as follows. A bandwidth or a variable deadband of ±14 MHz is chosen, the lower limit of which is at −10 MHz or the upper limit of which is at +10 MHz. If the charging state of the energy store is too low, that is to say lies below a standard range or standard value, the energy store should be charged if at all possible. For this purpose, the bandwidth is chosen with limits of −10 MHz to +4 MHz. Within these limits, no control power is delivered, that is to say control power is delivered along the solid line according to FIG. 1. Outside these limits, control power is delivered as desired, that is to say in inverse proportion to the frequency deviation Δf, that is to say a negative control power in the range from +4 MHz to +10 MHz along the dotted line. Therefore, although no control power has to be delivered, in this range energy is taken up from the electricity network and consequently the energy store is charged, and thus the charging state is adapted.

The converse procedure is followed if the charging state of the energy store is too great, that is say lies above a standard range or a standard value. Then, the energy store should be discharged, if at all possible. For this purpose, the bandwidth is chosen with limits of −4 MHz to +10 MHz. Within these limits, no control power is delivered, that is to say control power is delivered along the solid line according to FIG. 1. Outside these limits, control power is delivered as desired, that is to say in inverse proportion to the frequency deviation Δf, that is to say a positive control power in the range from −10 MHz to −4 MHz along the dotted line. Therefore, although no control power has to be delivered, in this range energy is delivered to the electricity network and consequently the energy store is discharged, and thus the charging state is adapted.

In both cases, the position of the bandwidth or of the variable deadband is therefore chosen asymmetrically to the frequency deviation of 0 MHz, and in this way the desired medium charging state is aimed for. When the desired medium charging state has been reached, or exists, the bandwidth or the variable deadband can be chosen with the limits −4 MHz to +4 MHz or else −10 MHz to +10 MHz symmetrically to the frequency deviation 0 MHz or with limits between −10 MHz and −4 MHz or +4 MHz and +10 MHz symmetrically or asymmetrically to the frequency deviation of 0 MHz. Preferably, however, the limits −4 MHz to +4 MHz are chosen, in order to control the network frequency as accurately as possible.

Depending on the accuracy, that is to say depending on the type of errors in the measurement of the frequency deviation Δf, it may also be provided that the limits of the bandwidth are even chosen more narrowly than the accuracy. For example, the error range could be asymmetric, that is to say the frequency deviation in the range of less than 5 MHz could be more accurate than in the range above that, for example the measuring error could be proportional to the frequency deviation, whereby the accuracy would then be in inverse proportion to the frequency deviation. This could also be appropriate if the maximum error in the determination of the frequency deviation only occurs very rarely. Although there may then possibly be a counter-productive provision of the control power, this would only happen very rarely. At the same time, the network frequency is better controlled disproportionately, and so the small counter-productive way of working can be tolerated or accepted.

If the accuracy of the frequency measurement is greater than ±4 MHz, the limits of the bandwidth or of the variable deadband can be chosen even more narrowly, and consequently the charging state of the energy store can be adapted even better. In order to adapt the charging state still further, the other tolerances may also be additionally used.

The tolerances with respect to the accuracy of the measurement of the frequency deviation (dashed lines), the over-provision of the control power by a percentage value (dash-dotted lines) and the over-provision of the control power by a fixed amount (not shown) add together to form a tolerance in which the control power P can be delivered around the solid curve. The sum of the first two tolerances is given by the area that is bounded by the two dashed curves and by the dash-dotted curves. The dashed and dash-dotted lines (curves) represent the maximum and minimum control power that can be fed into the electricity network or removed from the electricity network while using these two tolerances in the case of a given frequency deviation when there is an error-free measurement of the frequency deviation. These tolerances of the requested control power can be used for setting the charging state of the energy store.

When using the tolerances that are represented by the dashed and the dash-dotted lines, it should be noted that, under actual conditions, a distance from the dashed and/or dash-dotted curves that is limited by the own actual measuring accuracy must be maintained. This prevents the control power that is actually provided from lying outside the tolerance. Therefore, the greater the accuracy of the own measurement of the control power provided and/or of the frequency deviation Δf, the closer the control power can also be delivered to the dashed or dash-dotted lines, and the better use can also be made of the tolerance between these curves.

In an extreme case (with frequency measurement and/or power measurement of any desired accuracy), therefore, an energy store may be operated along the dashed or dash-dotted lines, in order to keep the charging state of the energy store in a desired medium range. In particular whenever the charging state is already in the medium range or when there is a request for positive control power just above that or when there is a request for negative control power just below that, it may however also be entirely appropriate to operate the energy store along the solid line, in order to provide the control power as desired. In the case of a slight deviation, it may also be appropriate to operate in an intermediate region between the solid line and the dashed or dash-dotted lines.

The dotted line within the limits of ±10 MHz may likewise be assigned a tolerance with respect to the control power and the frequency measurement. These tolerances may likewise be used when delivering control power outside the bandwidth.

There may also be a time tolerance, that is to say that an actual provision of the control power must not take place for example until 10 seconds or 30 seconds after a change of the required control power is detected by a change of the frequency deviation Δf that necessitates feeding in or taking up of control power. According to the invention, and according to a particularly preferred embodiment of a method according to the invention, this time tolerance may also be used to adapt the charging state of the energy store that is used for delivering control power.

If the energy store is relatively fully charged, that is to say the charging state of the energy store is in the upper range, that is to say for example between 75% and 90% of the maximum energy to be stored of the energy store, the energy store is operated in the vicinity of the upper right-hand dashed or dash-dotted curve. If a request for positive control power is established by a negative frequency deviation Δf, positive control power is therefore then provided at a very early time, this control power also tending to be higher than is actually required by the network operator and than is indicated by the solid middle line. This has the effect that the energy store is discharged more strongly than if it were operated according to the solid middle line.

In the case of a request for negative control power that is established by a positive frequency deviation Δf, it is possible when using the time tolerance, that is to say when choosing the time at which the power is delivered, to respond as late as possible to the request, and then also only with as little energy take-up as possible in cases of relatively low power levels. This has the effect that the energy store takes up less energy than if it were operated according to the solid middle line. In both cases, it is therefore achieved by these measures according to the invention that, after a control cycle, the charging state of the energy store is closer to the desired medium charging state than if it were operated as in the conventional way along the solid line.

If the energy store is charged to a relatively low extent, that is to say the charging state of the energy store is in the lower range, that is to say for example between 10% and 25% of the maximum charge of the energy store, the energy store is operated in the vicinity of the lower left-hand dashed or dash-dotted curve. If a request for positive control power is established by a negative frequency deviation Δf, positive control power is therefore then provided at a very late time, this control power also tending to be lower than is actually required by the network operator and than is indicated by the solid middle line. This has the effect that the energy store is discharged less than if it were operated according to the solid middle line.

In the case of a request for negative control power that is established by a positive frequency deviation Δf, the response to the request is by contrast as early as possible, and then also with a higher energy take-up in cases of relatively high power levels. This has the effect that the energy store takes up more energy than if it were operated according to the solid middle line. Also in these two cases, it is therefore achieved by the method according to the invention that, after a control cycle, the charging state of the energy store is closer to the desired medium charging state than if it were operated as in the conventional way along the solid line.

On average statistically, a lower capacity of the energy store has to be kept available when using a method according to the invention than in the case of a conventional method. Since energy stores with greater capacities are more expensive than those with a lower capacity, this allows costs to be saved and fewer resources are used for construction. Alternatively, greater control power can be provided by an energy store of the same dimensions, as long as the power electronics are adapted or are sufficient.

Particularly suitable for methods according to the invention are galvanic elements, in particular rechargeable batteries, most particularly preferably lithium-ion batteries, since they can react very quickly and can therefore make use of the different tolerances particularly well. Slower energy stores, such as for example hydrogen stores and fuel cells or gas-powered plants with natural gas generators and natural gas stores, need a certain time to be able to provide the power. Due to this inertia, the tolerances, in particular the time tolerances, cannot be used as well. Moreover, in comparison with other components, the capacity of these energy stores is not as costly as in the case of rechargeable batteries or flywheels, and so the benefit of using a method according to the invention is also not so great.

Figure 2:
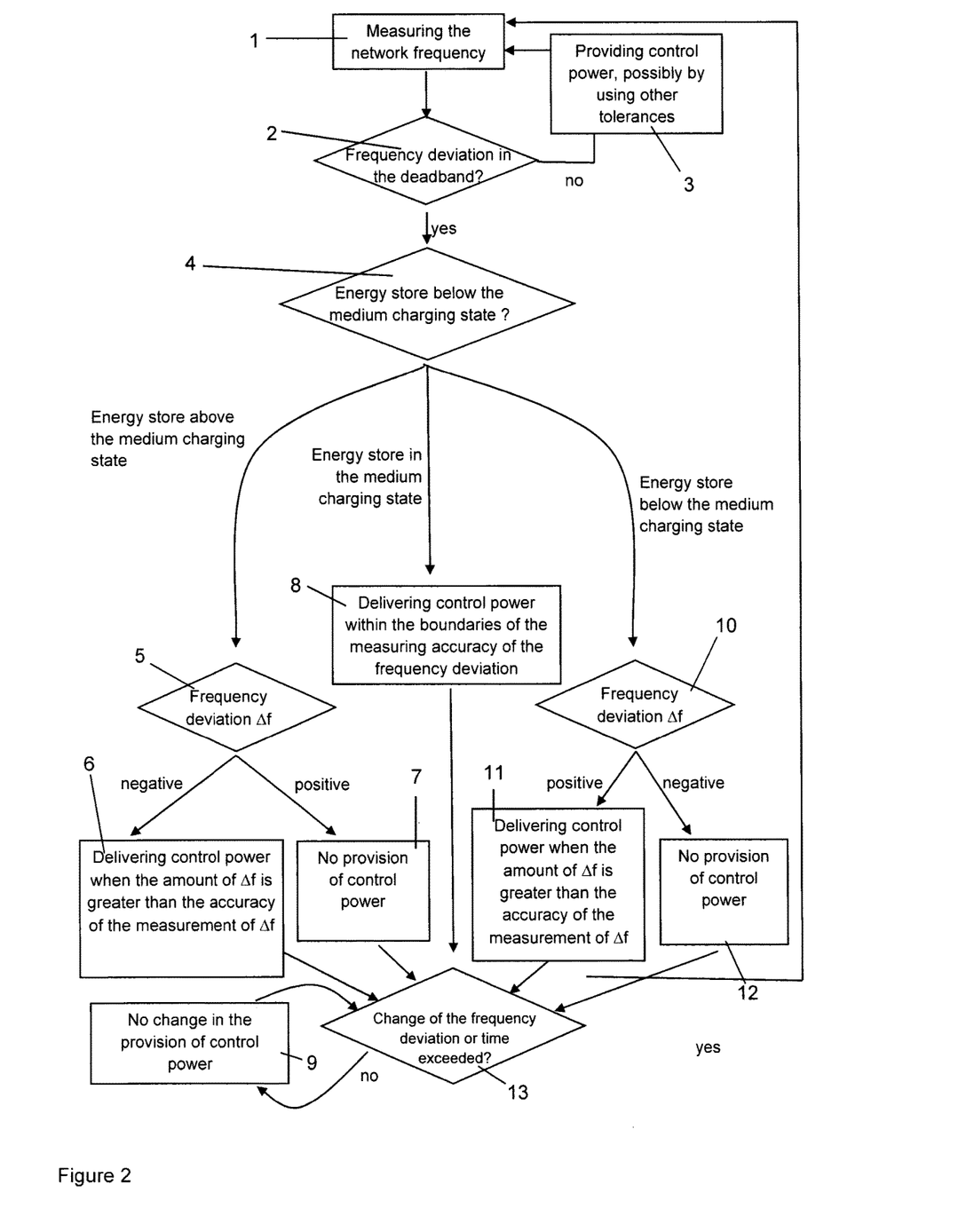
FIG. 2 shows a flow diagram for a method according to the invention.

FIG. 2 shows a flow diagram by way of example for a method according to the invention. Here, the cycle begins with method step 1, in which the network frequency of an electricity network is measured. In decision step 2, it is checked whether a frequency deviation is within the deadband (for example in the range of ±10 MHz) or not (that is to say outside the deadband). If a need for control power is measured by measuring the frequency deviation Δf from the desired frequency outside the deadband, in method step 3 control power is made available, possibly by using other tolerances in order to adapt the charging state of an energy store for the provision of control power. If the frequency deviation is within the deadband, the charging state of the energy store is checked in a subsequent decision step 4, in order to establish whether or not the energy store is in the range of a desired medium charging state.

If this is the case, in a method step 8 control power is provided by the energy store within the boundaries of the measuring accuracy of the frequency deviation. For the example of a measuring accuracy of ±4 MHz of the frequency deviation, this would have the effect that, with a frequency deviation of −10 MHz to −4 MHz and of +4 MHz to +10 MHz, control power would be delivered in inverse proportion to the frequency deviation, while within the bandwidth from −4 MHz to +4 MHz no control power would be delivered. In method step 8, a bandwidth or variable deadband of −4 MHz to +4 MHz would therefore be chosen. More generally, for example in the case of a measuring accuracy of ±x MHz (0<x<10 MHz) of the frequency deviation, a bandwidth of −x MHz to +x MHz can be chosen.

If, on the other hand, in decision step 4 it is established that the charging state of the energy store is above the medium charging state of the energy store, it is checked in a decision step 5 whether there is a positive or negative frequency deviation if from the desired frequency.

In the case of a positive frequency deviation $\Delta f$ when there is a charging state of the energy store above the medium charging state of the energy store, no control power is provided in a method step 7, since the energy store is not to be charged any further. If a negative frequency deviation $\Delta f$ is established when there is a charging state of the energy store above the medium charging state of the energy store, control power is only not provided in method step 6 if the amount of the frequency deviation $\Delta f$ is less than the accuracy of the measurement of the frequency deviation $\Delta f$, or in positive terms control power is only provided in method step 6 if the amount of the measured frequency deviation $\Delta f$ is greater than the accuracy of the measurement of the frequency deviation $\Delta f$. Proceeding in this way defines the bandwidth or the variable deadband or the limits thereof.

If in decision step 4 it is established that the charging state of the energy store is below the medium charging state of the energy store, it is checked in a decision step 10 whether there is a positive or negative frequency deviation $\Delta f$ from the desired frequency.

In the case of a negative frequency deviation $\Delta f$ when there is a charging state of the energy store below the medium charging state of the energy store, no control power is provided in a method step 12, since the energy store is not to be discharged any further. If a positive frequency deviation $\Delta f$ is established when there is a charging state of the energy store below the medium charging state of the energy store, control power is only not provided in method step 11 if the amount of the frequency deviation $\Delta f$ is less than the accuracy of the measurement of the frequency deviation $\Delta f$, or in positive terms control power is only provided in method step 6 if the amount of the measured frequency deviation $\Delta f$ is greater than the accuracy of the measurement of the frequency deviation $\Delta f$. Proceeding in this way defines the bandwidth or the variable deadband or the limits thereof.

Finally, it is checked in a decision step 13 whether a change of the frequency deviation has taken place or whether a time limit is exceeded. If this is not the case, no change of the control power is performed, that is to say the previous control power is provided in method step 9 and it is further checked in decision step 13 whether a change of the frequency deviation has taken place or whether a time limit is exceeded.

If there has been a change of the frequency deviation or the time limit is exceeded, the process continues recursively with method step 1. The time limit is chosen such that the charging state of the energy store changes appreciably within the time limit, for example by at least 0.5% of the maximum amount of energy that can be taken up. It would be equally possible to omit steps 13 and 9 and instead to continue after steps 6, 7, 11 and 12 each time with step 1 in order to realize a method according to the invention.

Figure 3:
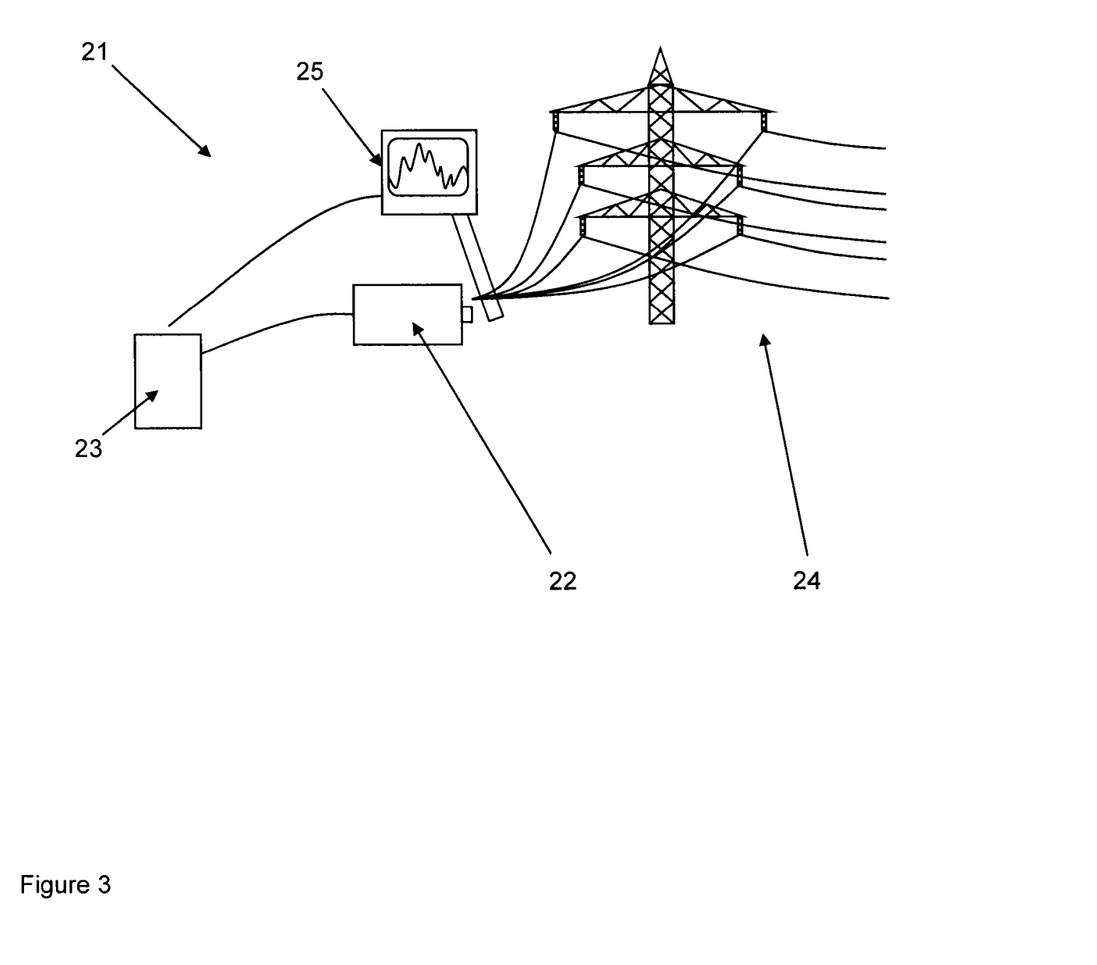
FIG. 3 shows a schematic representation of a device according to the invention for providing control power.

FIG. 3 shows in a schematic view a device 21 according to the invention, comprising an energy store 22. A master control system 23 is connected as the control system to the energy store 22, so that the master control system 23 can set the power take up and delivery of the energy store 22.

The energy store 22 is connected to an electricity network 24 and can take up power from the electricity network 24 and/or deliver power. The master control system 23 is connected to a device 25 for measuring the deviation between the network frequency at the given time and the setpoint value of the network frequency (in Europe 50 000 Hz) of the electricity network 24, in order to establish whether or not a control power must be delivered. If a change of the frequency deviation is measured, that is to say the need for control power—positive or negative control power—changes, the master control system 23 brings about the effect that the control power of the energy store 22 is adapted. The master control system 23 therefore controls the control power that is provided.

The device 25 is capable of determining the frequency deviation of the network frequency more accurately than is required. Thus, the tolerances in the determination of the network frequency and the deadband can be used to set the charging state of the energy store 22.

The charging state of the energy store 22 can be determined by the master control system 23 by way of a suitable measuring device, in order to implement a method according to the invention.

The master control system 23 may in this case charge or discharge the energy store 22 in such a way as to aim for a certain desired charging state. The choice of the limits of the bandwidth or of the variable deadband within the deadband prescribed by the network operator is used for this purpose. Therefore, for the adaptation of the charging state, control power is delivered in the deadband prescribed by the network operator.

Furthermore, tolerances in the frequency deviation from which a control power is to be delivered, tolerances in the amount of the control power to be delivered when there is a certain frequency deviation and tolerances in the time of the delivery of the control power, or tolerances in the determination of the frequency deviation as well as tolerances in the prequalified control power that can be delivered as a maximum are used to develop the charging state of the energy store 22 in the desired direction. Thus, for example, an over-provision of up to 20% beyond the maximum control power may be produced by the energy store 22, for example in the form of an overshoot, in order to control the charging state of the energy store 22.

A particularly quickly reacting and easily chargeable and dischargeable energy store 22 is particularly advantageous in such cases in particular. Rechargeable batteries are best suited for this. Li-ion batteries in particular can be quickly and frequently charged and discharged without any harmful influences on the battery, and so these are particularly suitable and preferred according to the invention for all of the exemplary embodiments. For this, Li-ion batteries with a considerable capacity must be provided. These can for example be easily accommodated in one or more 40 foot ISO containers.

A device 21 according to the invention is particularly well-suited in particular as a primary control power source but also as a secondary control power source.

For details concerning the control of control power and concerning information exchange with the network operators, reference is made to the network technology/network operation forum in the VDE (FNN) "TransmissionCode 2007" of November 2009.

The features of the invention disclosed in the preceding description, and in the claims, figures and exemplary embodiments can, both individually and in any possible combination, be essential for implementing the invention in its various embodiments.

LIST OF REFERENCE SIGNS

P Power
t Time
2; 4; 5; 13 Decision step
1; 3; 6; 7; 8; 9; 10; 11; 12 Method step
21 Device for providing control power
22 Energy store
23 Master control system/Control system
24 Electricity network
25 Device for determining the frequency deviation

The invention claimed is:

1. A method for providing control power, the method comprising:
providing the control power to discharge or charge an energy store for supplying energy to an electricity network or taking up energy from the electricity network respectively based on a frequency deviation from a desired frequency of the electricity network and a deadband around the desired frequency being prescribed, a charging state of the energy store being in one of (i) an upper charging state, (ii) a medium charging state, and (iii) a low charging state, amount of charge in the medium charging state being less than amount of charge in the upper charging state and the amount of charge in the medium charging state being more than amount of charge in the low charging state;
measuring the frequency deviation from the desired frequency with an accuracy greater than a width of the deadband; and
selecting a bandwidth within the deadband as a new deadband based on the charging state of the energy store to move the charging state toward the medium charging state.

2. The method according to claim 1, wherein
in dependence on the charging state, or the charging state at a given time, of the energy store, the bandwidth is chosen to be less than the width of the deadband if the charging state deviates from the medium charging state, or a semi-charged charging state at which the energy store contains approximately half of a maximum possible energy content, or between 40% and 60% of the maximum possible energy content, or a charging state range in a region of the semi-charged charging state, or including the semi-charged charging state, or between 20% and 80% of the maximum possible energy content, or between 30% and 70% of the maximum possible energy content, being defined as the medium charging state.

3. The method according to claim 1, wherein
for at least one charging state of the energy store, the bandwidth is reduced to an accuracy of a measurement of the frequency deviation.

4. The method according to claim 1, wherein
the charging state of the energy store is adapted, or a medium charging state is aimed for, by a choice of the bandwidth and a provision of the control power in the deadband.

5. The method according to claim 2, wherein
one of limits of the bandwidth is defined as the frequency deviation from a desired frequency that is established by an accuracy of a measurement, or one of limits of the bandwidth is defined by the desired frequency or by a frequency deviation between these values, a lower limit of the bandwidth being defined in this way if the charging state of the energy store is to be reduced, or the charging state lies above the medium charging state, and/or an upper limit of the bandwidth being defined in this way if the charging state of the energy store is to be increased, or the charging state lies below the medium charging state.

6. The method according to claim 1, wherein
the bandwidth is selected from two or more predetermined bandwidths, various states of charge, or every charging state of the energy store or various ranges of the charging state, or every range of the charging state, being assigned predetermined bandwidths.

7. The method according to claim 1, wherein
the bandwidth is chosen in proportion to a difference in charging state of the charging state at a given time of the energy store from the medium charging state, or the bandwidth depends linearly on the difference in the charging state of the charging state at the given time from the medium charging state.

8. The method according to claim 1, wherein
the charging state of the energy store is measured, or measured continuously, the control power delivered by the energy store to the electricity network being controlled in dependence on the charging state.

9. The method according to claim 1, wherein
outside the bandwidth, the control power is provided as desired by a network operator and/or an amount of the control power is delivered with respect to the frequency deviation in certain regions in inverse proportion to the frequency deviation of a network frequency, or linearly to the frequency deviation.

10. The method according to claim 1, wherein
within the bandwidth, no power is delivered from the energy store into the electricity network and no power is taken up from the electricity network into the energy store.

11. The method according to claim 1, wherein
the frequency deviation is measured with an accuracy of at least ±8 MHz, or at least ±4 MHz, or at least ±2 MHz, or at least ±1 MHz.

12. The method according to claim 1, wherein
when there is a change of the control power, a time after the change from which control energy is provided by the energy store is chosen in dependence on the charging state at a given time of the energy store.

13. The method according to claim 12, wherein
the time lies in a time interval between the change of the control power and a maximum after the change, or the time interval is 30 seconds in a case of a provision of primary control power.

14. The method according to claim 1, wherein
in the deadband no negative control power is taken up by the electricity network if the charging state of the energy store lies above a first limit value and/or in the deadband no positive control energy is fed into the electricity network if the charging state of the energy store lies below a second limit value, the first and second limit values defining a range of the medium charging state.

15. The method according to claim 1, wherein
a flywheel, a heat store, a hydrogen generator and store with a fuel cell, a natural gas generator with a gas-fired power plant, a pumped storage power plant, a compressed-air storage power plant, a superconducting magnetic energy store, a redox-flow element and/or a galvanic element, a rechargeable battery, and/or a battery storage power plant, is used as the energy store.

16. The method according to claim 15, wherein
a lithium-ion battery, a lead-sulphuric acid battery, a nickel-cadmium battery, a sodium-sulphide battery, and/or a Li-ion battery, and/or a composite of at least two of these rechargeable batteries is used as the energy store.

17. The method according to claim 1, wherein
the energy store has a capacity of at least 4 kWh, or at least 10 kWh, or at least 50 kWh, or at least 250 kWh.

18. The method according to claim 1, wherein
the energy store is operated jointly with at least one energy generator and/or at least one energy consuming entity for a provision of the control power for the electricity network.

19. The method according to claim 18, wherein
a closed-loop control and/or open-loop control of the energy store is operated in dependence on and in operative connection with the at least one energy generator and/or with the at least one energy consuming entity in a provision of the control power for the electricity network.

20. The method according to claim 1, wherein
a tolerance with respect to the frequency deviation from the desired frequency of the electricity network is used to set the charging state of the energy store at a same time as providing the control power by the energy store.

21. The method according to claim 1, wherein
a tolerance with respect to an amount of the control power provided is used to set the charging state of the energy store at a same time as providing the control power by the energy store, or an amount of a requested control power being exceeded, or by a maximum of 30% and/or by 10 MW, or by a maximum of 20% and/or by 5 MW, to make use of the tolerance with respect to the amount of the control power provided, or a percentage by which the amount of the requested control power is exceeded being chosen particularly in proportion to the deviation of the charging state of the energy store from the medium charging state.

22. The method according to claim 20, wherein
the charging state of the energy store is set by the energy store feeding into the electricity network a greater control power, lying within the tolerance, or taking up from the electricity network a smaller control power, lying within the tolerance, in a case that the charging state of the energy store lies above a first limit value, and/or the energy store feeding into the electricity network the smaller control power, lying within the tolerance, or taking up from the electricity network the greater control power, lying within the tolerance, in a case that the charging state of the energy store lies below a second limit value.

23. The method according to claim 1, wherein
a control power gradient is chosen in dependence on the charging state of the energy store, a variation over time of an amount of the control power being particularly set and a tolerance of the amount of the control power to be provided over time being used.

24. The method according to claim 1, wherein
when there is a change of the frequency deviation by less than a range of insensitivity, or by less than 10 MHz, a changed control power can only be delivered to set the charging state of the energy store, or the changed control power can only be delivered if the charging state of the energy store is thereby charged or discharged as strongly as possible towards the medium charging state or as little as possible away from the medium charging state.

25. A device for carrying out the method according to claim 1, comprising at least one energy store and a control system for controlling the control power of the energy store in an open-loop or closed-loop manner, the energy store being connected to the electricity network such that energy can be fed into the electricity network and can be removed from the electricity network by the device.

26. A The device according to claim 25, wherein
the device further comprises at least one energy generator and/or at least one energy consuming entity that is/are connected to the electricity network such that the control power can be fed into the electricity network by the energy generator and/or can be removed from the electricity network by the energy consuming entity, or the energy store can be charged by the energy generator and/or discharged by the energy consuming entity.

27. The device according to claim 25, wherein
the device further comprising a first measurement device for measuring the charging state of the at least one energy store and/or a second measurement device for measuring the frequency deviation of the network frequency from the desired frequency and a data memory, at least a bandwidth and/or the medium charging state of the energy store being stored in the data memory, the control system having access to the data memory and being designed for controlling the control power delivered and taken up by the energy store in dependence on the charging state of the energy store and/or on the frequency deviation.

28. The device according to claim 25, wherein
the energy store is a rechargeable battery, or a lithium-ion battery, a lead-sulphuric acid battery, a nickel-cadmium battery, a sodium-sulphide battery, and/or a Li-ion battery, and/or a composite of at least two of these rechargeable batteries.

* * * * *